(12) United States Patent
Friedlander, III

(10) Patent No.: US 6,952,995 B2
(45) Date of Patent: Oct. 11, 2005

(54) APPARATUS AND METHOD FOR PASSIVE VENTING OF ROCKET MOTOR OR ORDNANCE CASE

(75) Inventor: Mark Peyser Friedlander, III, Centerville, VA (US)

(73) Assignee: Aerojet-General Corporation, Redmond, WA (US)

( * ) Notice: Subject to any disclaimer, the term of this patent is extended or adjusted under 35 U.S.C. 154(b) by 273 days.

(21) Appl. No.: 10/042,391

(22) Filed: Jan. 11, 2002

(65) Prior Publication Data

US 2005/0193917 A1    Sep. 8, 2005

(51) Int. Cl.[7] .................................. F41A 9/00
(52) U.S. Cl. ................. 102/481; 102/486; 102/378; 102/494; 102/495
(58) Field of Search ................. 102/481, 486, 102/496, 378, 494–495; 60/39.1, 253–254, 60/223, 39.091

(56) References Cited

U.S. PATENT DOCUMENTS

| | | | |
|---|---|---|---|
| 3,052,091 A | * | 9/1962 | D'ooge |
| 3,295,324 A | * | 1/1967 | Conrad et al. ............... 60/254 |
| 3,357,356 A | * | 12/1967 | Bischoff ...................... 102/378 |
| 4,084,512 A | * | 4/1978 | San Miguel |
| 4,119,036 A | | 10/1978 | Hayashi et al. |
| 4,411,199 A | | 10/1983 | Yates et al. |
| 4,442,666 A | | 4/1984 | Vetter |
| 4,458,482 A | | 7/1984 | Vetter et al. |
| 4,478,151 A | | 10/1984 | Vetter et al. |
| 4,709,637 A | | 12/1987 | Boggero |
| 4,838,166 A | * | 6/1989 | Spies et al. ............... 102/481 |
| 5,035,180 A | | 7/1991 | Purcell et al. |
| 5,036,658 A | * | 8/1991 | Tate |
| 5,044,154 A | | 9/1991 | English, Jr. et al. |
| H001047 H | * | 5/1992 | Henderson et al. ........ 102/496 |
| 5,129,326 A | | 7/1992 | Brogan |
| 5,228,285 A | * | 7/1993 | Van Name et al. ........ 102/481 |
| 5,311,820 A | | 5/1994 | Ellingsen |
| 5,361,703 A | * | 11/1994 | Braithwaite ............... 102/481 |
| 5,394,803 A | | 3/1995 | Mort |
| 5,564,272 A | * | 10/1996 | Warner et al. |
| 5,735,114 A | * | 4/1998 | Ellingsen .................. 102/481 |
| 5,786,544 A | | 7/1998 | Gill et al. |
| 6,038,979 A | * | 3/2000 | Watson et al. ............ 102/481 |
| 6,338,242 B1 | * | 1/2002 | Kim et al. ................. 102/481 |
| 2002/0020323 A1 | * | 2/2002 | Dassis ....................... 102/481 |

* cited by examiner

Primary Examiner—Michael J. Carone
Assistant Examiner—L. Semunegus
(74) Attorney, Agent, or Firm—Nixon & Vanderhye, P.C.

(57) ABSTRACT

Passive venting apparatus and method for a rocket motor or ordnance device containing propellant or explosive material enclosed in a case, which presents an explosion hazard when subjected to external heat. A combustible strip is secured to the exterior surface of the case and is constructed to burn and generate sufficient heat when exposed to predetermined external heat to weaken the adjacent portion of the case and effect rupture of the case to vent interior gases therein prior to autoignition of the propellant or explosive.

17 Claims, 4 Drawing Sheets

APPARATUS AND METHOD FOR PASSIVE VENTING OF ROCKET MOTOR OR ORDNANCE CASE

BACKGROUND OF THE INVENTION

The present invention relates to the passive venting of a case for a rocket motor or ordnance item, such as a warhead, and more particularly to a new and improved apparatus and method for weakening and effecting rupture of the case in the event it is exposed to a severe thermal threat to prevent a catastrophic explosion or detonation of the propellant or explosive within the case as the result of pressure buildup therein.

Rocket motors or ordnance items present an extreme hazard in the event of "cook-off" which may be defined as the detonation or deflagration of an active material such as an explosive or a propellant charge, owing to external heating in an accidental fire or the like. This hazard is typically minimized by providing a case which contains the charge, with an arrangement for opening the case to vent pressure therein before the explosive or propellant attains a temperature where cook-off may occur. Such a case contributing to cook-off may be a wall, as of a rocket motor or penetrating warhead, directly in contact with the active material but may include structure surrounding the motor or warhead.

Prior art cook-off prevention arrangements include rocket motor cases of reinforced plastic which soften and fail on fast, direct cook-off from exposure to flame before a contained propellant attains cook-off temperature. However, this arrangement is ineffective when the case is subjected to slow cook-off from indirect heating. Another arrangement utilizes a case with stress riser grooves which cause the case to open at the grooves when the case is subjected to pressure by an explosive therein initially decomposing from heat. This arrangement is effective with relatively weak cases on both fast, direct cook-off and slow, indirect cook-off. However with a relatively strong case for target penetration, the stress risers cannot weaken the case sufficiently so that venting either does not occur to prevent cook-off or occurs at such a high pressure that nearby structures are damaged and personnel are injured.

Prior art cook-off prevention arrangements also include a case provided with an orifice having a closure opened or released by melting or thermal stress. Other prior art arrangements include a case vented by thermal stress when one side is heated. This stress may be increased by stiffening and thermally insulating portions of the case. These arrangements, like the stress riser arrangement, are deficient with strong cases. Further prior art arrangements include explosive or other case penetrators activated at a temperature approaching cook-off. These latter arrangements are effective but may themselves be a hazard and require initiation devices which are relatively complex and may be adversely affected by long storage.

SUMMARY OF THE INVENTION

The new and improved passive venting apparatus and method of the present invention utilizes one or more combustible strips applied to the exterior of the rocket motor or ordnance case which are constructed to burn and provide sufficiently high heat input into the adjacent portion or portions of the case to weaken it and aid in the passive venting of the case when exposed to a severe thermal threat. The strip or strips may be formed of any suitable, combustible metallic or non-metallic material such as magnesium or a magnesium alloy, mixtures of metal powders such as iron or aluminum, or a palladium-aluminum alloy. The strip or strips may be of any suitable size, configuration or number, and may be positioned on the case in any suitable or desired orientation.

In one embodiment, a single strip of a suitable length and thickness may be utilized. In a second embodiment, a number of strips may be spaced about the case, and in a further embodiment the strip may be in the form of one or more rings surrounding the case. The strip or strips may be secured to the case in any suitable or desired manner, or may be part of the external structure of the case.

DESCRIPTION OF THE PREFERRED EMBODIMENTS

Figure 1:
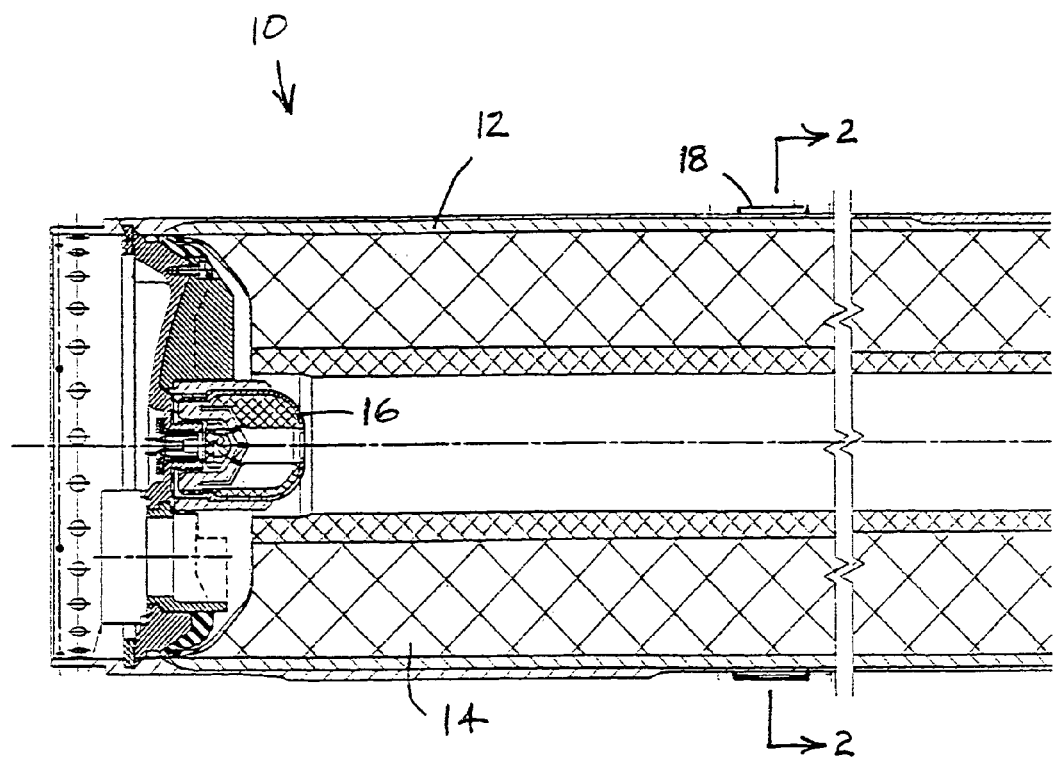
FIG. 1 is a side elevational view in section of one embodiment of the passive venting apparatus of the present invention.
Figure 2:
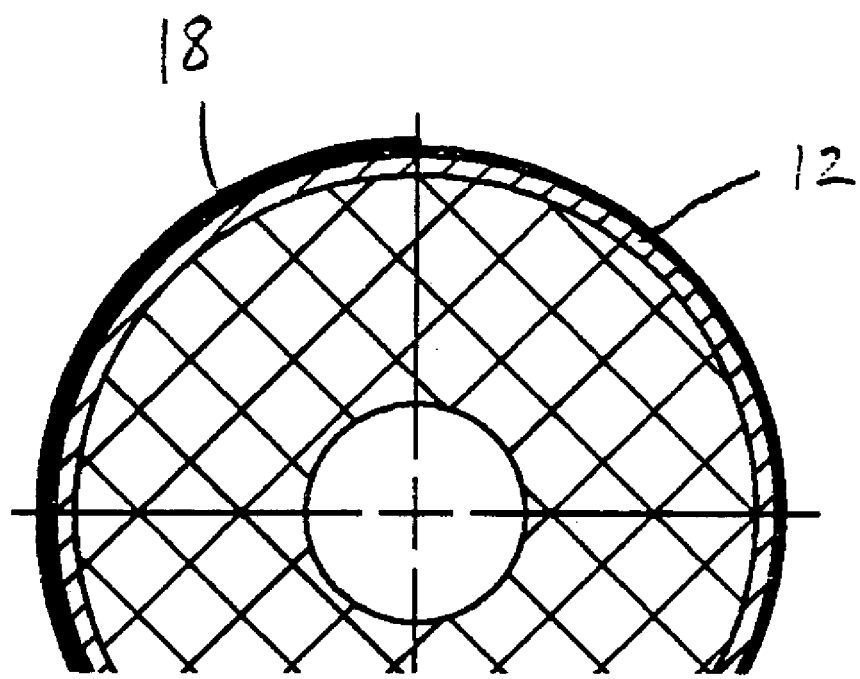
FIG. 2 is a sectional view taken substantially along line 2—2 in FIG. 1.

As shown in FIGS. 1 and 2, the rocket motor or ordnance item 10 comprises a case 12 formed of a suitable material such as steel having a propellant or explosive composition 14 therein and an igniter 16 at one end of the case for igniting the propellant or explosive. A combustible strip 18 is secured to the exterior of the case 12, or is formed as a part of the external structure of the case. The strip 18 is formed of a material that will burn when exposed to heat from an external or surrounding fire or the like, and generate sufficient heat to weaken the adjacent portion of the case 12 in contact therewith to effect rupture of the case and venting of hot gases generated by the propellant or explosive 14 before "cook-off" or autoignition thereof in response to the external or surrounding fire or the like. In this manner, a catastrophic explosion caused by the hot gases within the case generated by the propellant or explosive is effectively prevented. The strip 18 is formed of a material that will not combust under the normal operating temperature extremes of the propellant or explosive in the case.

The strip 18 may be of any suitable size and configuration and may be formed of any suitable metallic or non-metallic material that generates sufficient heat when exposed to a fire or the like to sufficiently weaken the adjacent portion or portions of the case. Preferably, the strip 18 is formed of magnesium or a magnesium alloy. The strip 18 may also be formed of metal powders such as iron and aluminum, or a palladium-aluminum alloy. Depending on the material of the case 12, the strip 18 could be formed of other suitable heat-generating metallic or organic materials.

If a single strip 18 is used, as shown in FIGS. 1 and 2, it may be of any suitable length, width, thickness and configuration, depending on the size, thickness and configuration of the case 12. As an illustrative embodiment, if the case were formed of steel with a diameter of 10 inches and a thickness of 0.05 inches, a strip 18 of magnesium could be used having a length of 22 inches, a width of 1½ inches and a thickness of 0.05 inches.

Strip 18 may be secured to the case 12 in any suitable manner, such as by clamps, screws, clips, rivets or the like (not shown). It is necessary that the securing means be constructed to hold the strip 18 in contact with or close to the adjacent portions of the case 12 during its exposure to an external fire or the like. The strip 18 may also be formed as a part of the external structure of the case.

Figure 3:
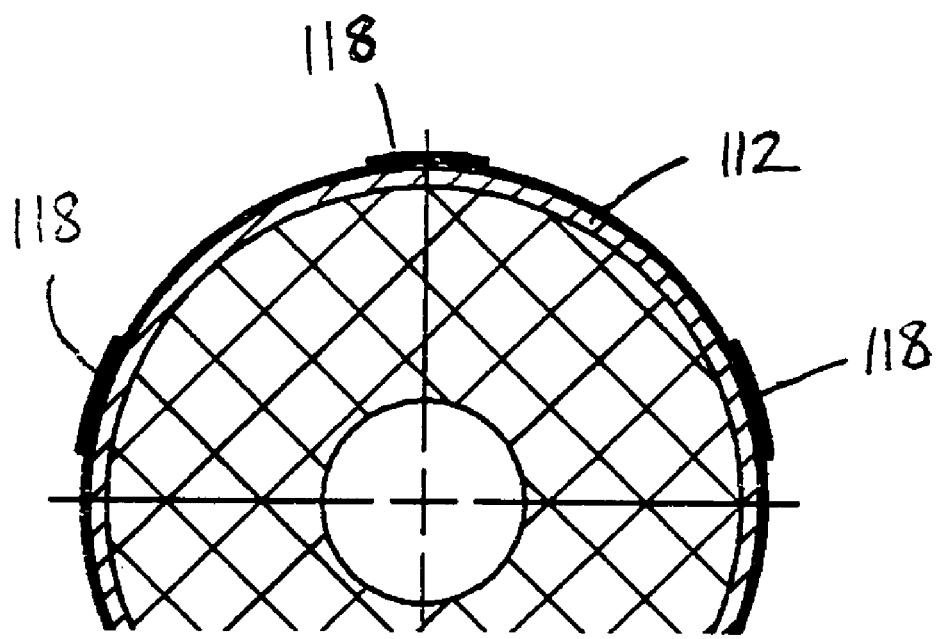
FIG. 3 is a view similar to FIG. 2 showing a second embodiment of the passive venting apparatus of the present invention.

FIG. 3 illustrates a second embodiment of the present invention wherein a plurality of small strip sections 118 are secured to the case 112 in circumferentially, longitudinally or other spaced relation thereon. The number, size and configuration of the strip sections 118 are determined by the size and material of the case 112 such that the strip sections generate sufficient heat to weaken the adjacent portions of the case to effect rupture and venting thereof in the event of a surrounding or external fire or the like.

Figure 4:
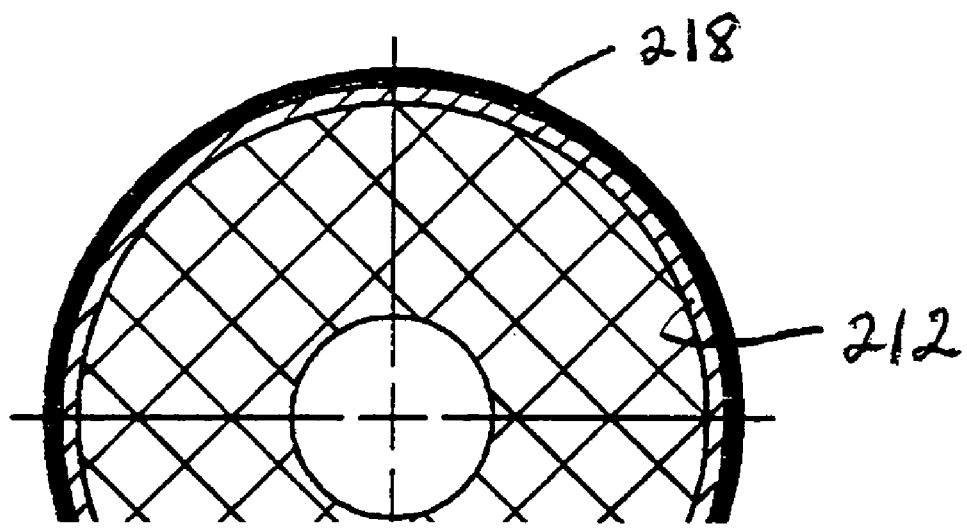
FIG. 4 is a view similar to FIG. 2 showing a third embodiment of the passive venting apparatus of the present invention.

FIG. 4 illustrates a third embodiment of the present invention wherein the strip is in the form of one or more rings 218 closely surrounding the case 212. Again, the size and material of the ring or rings 218 will be determined by the size and material of the case 212.

From the foregoing description, it will be apparent that the passive venting apparatus of the present invention is simple in construction, inexpensive to produce and assemble, and effective in operation, as compared with the prior art devices and methods for effecting venting of rocket motor or ordnance cases to prevent cook-off when exposed to a surrounding or external fire or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a rocket motor or ordnance device containing propellant or explosive material enclosed in a case, which presents an explosion hazard when subjected to external heat, the improvement comprising:
    an exposed combustible strip formed of a non-explosive and non-pyrotechnic material secured to or formed as a part of the exterior surface of the case;
    said strip being constructed to burn and generate sufficient heat when exposed to predetermined external heat to weaken the adjacent portion of the case and effect rupture of the case to vent interior gases therein prior to autoignition of the propellant or explosive.

2. The rocket motor or ordnance device of claim 1 wherein said strip is in contact with the exterior surface of the case.

3. The rocket motor or ordnance device of claim 1 wherein said strip is formed of a metallic material.

4. The rocket motor or ordnance device of claim 1 wherein said strip extends partially around the exterior surface of the case.

5. The rocket motor or ordnance device of claim 1 wherein a plurality of metallic strips are secured to the exterior surface of the case in spaced relation thereon.

6. The rocket motor or ordnance device of claim 5 wherein said strips are in circumferentially spaced relation on the exterior surface of the case.

7. The rocket motor or ordnance device of claim 5 wherein said strips are in longitudinally spaced relation on the exterior surface of the case.

8. The rocket motor or ordnance device of claim 1 wherein said strip is in the form of a ring extending completely around the exterior surface of the case.

9. The rocket motor or ordnance device of claim 8 wherein a plurality of metallic strips in the form of rings are mounted in spaced relation on the exterior surface of the case.

10. The rocket motor or ordnance device of claim 1 wherein the case is formed of metal and said strip is formed of magnesium.

11. The rocket motor or ordnance device of claim 10 wherein said strip is formed of a magnesium alloy.

12. The rocket motor or ordnance device of claim 1 wherein the case is formed of metal and said strip is formed of an iron and aluminum powder mixture.

13. The rocket motor or ordnance device of claim 1 wherein the case is formed of metal and said strip is formed of a palladium-aluminum alloy.

14. A method of venting a rocket motor or ordnance device case containing propellant or explosive material which presents an explosive hazard when subjected to external heat, comprising the step of providing an exposed combustible strip on the exterior surface of the case;
    said strip being formed of a non-explosive and non-pyrotechnic material constructed to burn and generate sufficient heat when exposed to predetermined external heat to weaken the adjacent portion of the case and effect rupture of the case to vent interior gases therein prior to autoignition of the propellant or explosive.

15. The method of claim 14 wherein a plurality of combustible strips are provided on the exterior surface of the case in spaced relation thereon.

16. The rocket motor or ordnance device of claim 1 wherein said strip is formed of a material that generates heat when combusted at a rate faster than the material of the case.

17. The rocket motor or ordnance device of claim 16 wherein said strip is formed of a metal or a metal ore.

* * * * *